United States Patent
Shigenaga

(10) Patent No.: US 12,409,748 B2
(45) Date of Patent: Sep. 9, 2025

(54) VEHICLE CONTROL DEVICE

(71) Applicant: TOYOTA JIDOSHA KABUSHIKI KAISHA, Toyota (JP)

(72) Inventor: Masato Shigenaga, Utsunomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 18/487,298

(22) Filed: Oct. 16, 2023

(65) Prior Publication Data

US 2024/0198833 A1 Jun. 20, 2024

(30) Foreign Application Priority Data

Dec. 15, 2022 (JP) .................. 2022-200595

(51) Int. Cl.
*B60L 53/36* (2019.01)
*B60L 53/126* (2019.01)
*B60L 53/38* (2019.01)

(52) U.S. Cl.
CPC ............. *B60L 53/36* (2019.02); *B60L 53/126* (2019.02); *B60L 53/38* (2019.02)

(58) Field of Classification Search
CPC ........ B60L 53/126; B60L 53/38; B60L 53/66; Y02T 10/70; Y02T 10/7072
See application file for complete search history.

(56) References Cited

U.S. PATENT DOCUMENTS

| | | | |
|---|---|---|---|
| 2020/0148263 A1* | 5/2020 | Imai ...................... | B60W 30/06 |
| 2020/0198489 A1* | 6/2020 | Yoon .................. | G08G 1/09685 |
| 2022/0266708 A1* | 8/2022 | Sakai .................. | G01C 21/3647 |
| 2022/0266860 A1* | 8/2022 | Mikuriya ............ | B60W 50/085 |
| 2022/0297677 A1* | 9/2022 | Morimoto ............. | B60W 30/06 |

FOREIGN PATENT DOCUMENTS

| | | |
|---|---|---|
| JP | 2020-048250 A | 3/2020 |
| JP | 2020-049983 A | 4/2020 |

* cited by examiner

*Primary Examiner* — Sisay Yacob
(74) *Attorney, Agent, or Firm* — Oliff PLC

(57) ABSTRACT

A vehicle control device mounted on a vehicle, includes: an automatic parking control unit that performs automatic parking control, and a non-contact charging control unit that performs non-contact charging control. Further, while the automatic parking control unit performs the automatic parking control, the non-contact charging control unit specifies radio communication information associated with a parking space of a parking target with reference to map information, and performs pairing between a power transmission device and a power receiving device by using the specified radio communication information.

2 Claims, 5 Drawing Sheets

VEHICLE CONTROL DEVICE

CROSS-REFERENCE TO RELATED APPLICATION(S)

The present application claims priority to and incorporates by reference the entire contents of Japanese Patent Application No. 2022-200595 filed in Japan on Dec. 15, 2022.

BACKGROUND

The present disclosure relates to a vehicle control device.

According to Japanese Laid-open Patent Publication No. 2020-048250, in the communication between the vehicle and the power supply equipment, a plurality of power supply stands provided in the power supply equipment transmits a radio wave signal, when the vehicle receives a radio wave signal from a plurality of power supply stands, the vehicle control device, based on the reception strength and the reception direction of each radio wave signal it is disclosed to select a power supply stand to establish communication.

SUMMARY

There is a need for providing a vehicle control device that can realize the pairing between the power transmission device on the ground side and the power receiving device on the vehicle side in a simple manner.

According to an embodiment, a vehicle control device mounted on a vehicle includes: an automatic parking control unit that performs automatic parking control for automatically parking the vehicle in a parking space which is a parking target selected by a user of the vehicle from among a plurality of parking spaces provided in a parking lot, and a non-contact charging control unit that performs non-contact charging control for transmitting power from a power transmission device installed in the parking space to a power receiving device provided in the vehicle in a non-contact manner and stores the power in a battery mounted on the vehicle. Further, while the automatic parking control unit performs the automatic parking control, the non-contact charging control unit specifies radio communication information associated with the parking space of the parking target with reference to map information, and performs pairing between the power transmission device and the power receiving device by using the specified radio communication information.

DETAILED DESCRIPTION

In the configuration described in Japanese Laid-open Patent Publication No. 2020-048250, when selecting an arbitrary power supply stand from a plurality of power supply stands, it is necessary to provide a measurement rejection device separately from the communication device to each of the vehicle and a plurality of power supply stands since the cost increases.

Hereinafter, a vehicle control apparatus according to an embodiment of the present disclosure will be specifically described. Note that the present disclosure is not limited to the embodiments described below.

Figure 1:
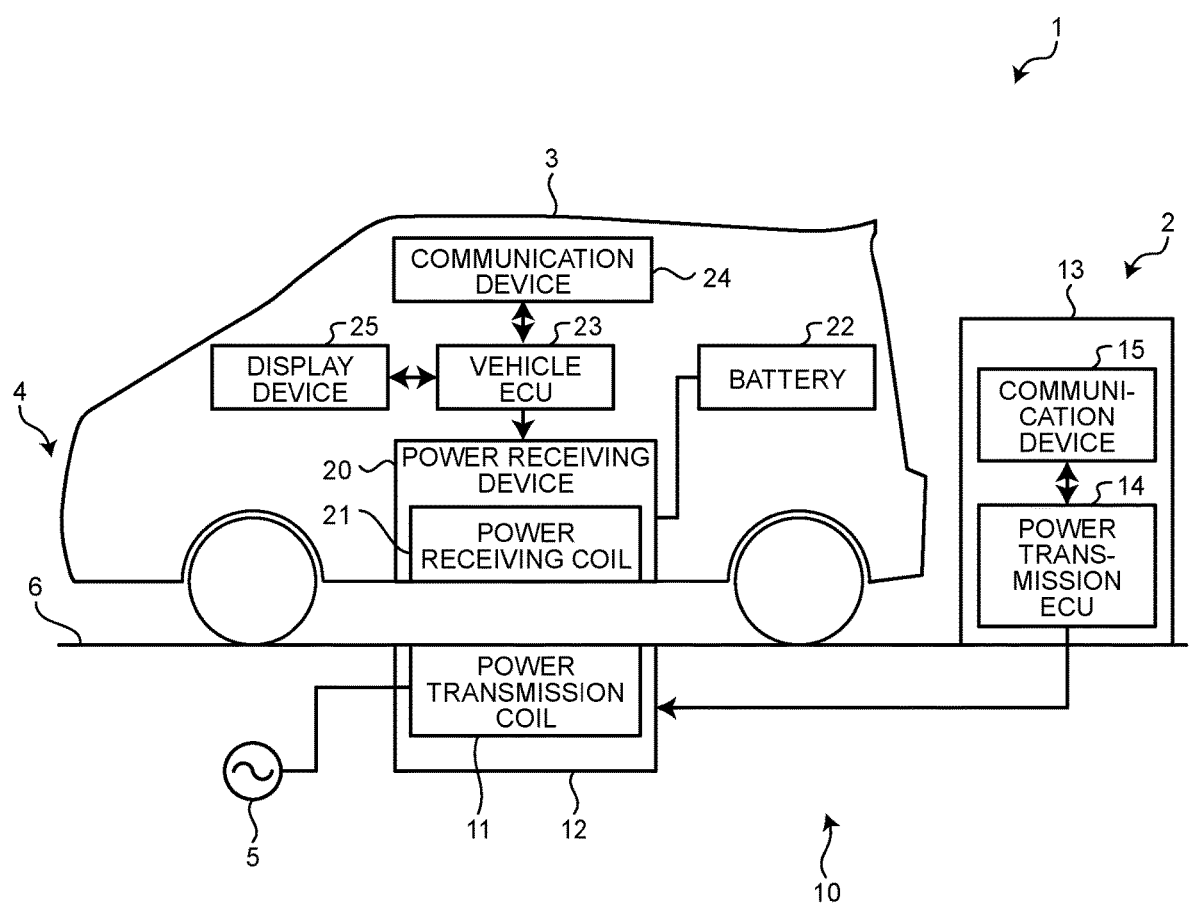
FIG. 1 is a diagram schematically illustrating a non-contact charging system in the embodiment.

FIG. 1 is a schematic diagram illustrating a non-contact charging system in the embodiment. The non-contact charging system 1 includes a power supply facility 2 and a vehicle 3. The non-contact charging system 1 includes a wireless power transmission system that transmits power from the power supply facility 2 to the vehicle 3 in a non-contact manner. In the non-contact charging system 1, in a state where the vehicle 3 is stopped in the parking lot 4, the power receiving coil 21 of the power receiving device 20 in the vehicle 3 can receive the power transmitted in a non-contact manner from the power transmission coil 11 of the power transmission device 10.

The power supply facility 2 is a facility for supplying power to the vehicle 3. The power supply equipment 2 is provided in the parking lot 4 such as commercial facilities and public facilities and accommodation facilities. The power supply facility 2 includes a power transmission device 10 and an AC power source 5 that supplies power to the power transmission device 10. The AC power supply 5 is a commercial power supply or a home power supply.

The power transmission device 10 includes a power transmission unit 12 having a power transmission coil 11 and a box 13. The power transmission device 10 is installed in the parking space 6 of the parking lot 4. For example parking lot 4 has a plurality of parking spaces 6. In this case, the power transmission device 10 is installed for each parking space 6.

Transmission unit 12 is installed on the ground in the parking space 6. The box 13 is located near the parking space 6, for example, a wall of the parking lot 4. The power transmission unit 12 and the box 13 are electrically connected. The power from the AC power source 5 is supplied to the power transmission unit 12. The transmission device 10 has a power conversion unit that converts the AC power supplied from the AC power source 5 into transmission power to output to the power transmission coil 11.

Further, the power transmission device 10 includes a power transmission ECU 14 for controlling the power converting unit and a communication device 15 for communicating with the vehicles 3. In the box 13, the power transmission ECU 14 and the communication device 15 is provided.

The power transmission ECU 14 includes a processor and a memory (main storage unit). The processor is composed of a Central Processing Unit (CPU), a Digital Signal Processor (DSP), an Field-Programmable Gate Array (FPGA), and a Graphics Processing Unit (GPU). The memory consists of a Random Access Memory (RAM) and a Read Only Memory (ROM). Signals from various sensors are inputted into the power transmission ECU 14. The power transmission ECU 14 performs various controls based on signals inputted from various sensors. For example, the power transmission ECU 14 controls the switching elements included in the power converting unit to adjust the power for power transmission. The power transmission ECU 14 executes power transmission control for controlling power transmission of the power transmission device 10. The power transmission ECU 14 executes communication control for controlling the communication of the communication device 15.

The communication device 15 performs wireless communication with the vehicle 3 to be parked in the parking space 6. The communication device 15 transmits information from the power transmission ECU 14 to the vehicle 3 and receives information transmitted from the vehicle 3. The communication device 15 is capable of wireless communication by, for example, Wi-Fi (registered trademark) or a wireless LAN. The communication device 15 outputs a radio signal as a short-range wireless communication targeting the vehicle 3 in the parking lot 4.

The vehicle 3 is an electric vehicle capable of charging power supplied from an external power source, for example, an electric vehicle (BEV) or plug-in hybrid vehicle (PHEV) and the like. The vehicle 3 is a vehicle capable of stopping in the parking space 6 in which the power transmission coil 11 is installed. The vehicle 3 includes a power receiving device 20, a battery 22 for storing power received by the power receiving device 20, a vehicle ECU 23 for controlling the vehicle 3, a communication device 24, and a display device 25.

The power receiving device 20 includes a power receiving coil 21. The power receiving coil 21 receives the power transmitted from the power transmission coil 11 in a non-contact manner. The power receiving device 20 supplies the power received from the power transmission device 10 to the battery 22. The power transmission device 10 and the battery 22 are electrically connected to each other.

The battery 22 is an in-vehicle battery that can be externally charged. The battery 22 is constituted by a secondary battery for storing power supplied from the power receiving device 20.

The vehicle ECU 23 is a vehicle control device mounted on the vehicle 3. The vehicle ECU 23 is configured in the same way as the power transmission ECU 14 as a hardware-based configuration. The vehicle ECU 23 executes various vehicle control based on signals input from various sensors mounted on the vehicle 3, information acquired through communication using the communication device 24, and information input through manipulation on the display device 25.

The communication device 24 performs wireless communication with an external device. The communication device 24 performs wireless communication with the communication device 15 of the power transmission device 10. The communication device 24 transmits information from the vehicle 3 to the power transmission device 10 and receives information transmitted from the power transmission device 10 to the vehicle 3. The communication device 24, when the vehicle 3 is present in the parking lot 4, receives a radio signal as short-range wireless communication transmitted from the power transmission device 10 in the parking lot 4. That is, the communication device 24 includes a short-range communication device that enables short-range wireless communication and a far-range communication device that enables far-range wireless communication.

The display device 25 is a device that functions as a display unit of the car navigation system. The display device 25, it is possible to display the map information corresponding to the current position of the vehicle 3. The display device 25 also functions as an input unit for receiving an input operation from the user of the vehicle 3. The displayed device 25 is controlled by the vehicle ECU 23.

Figure 2:
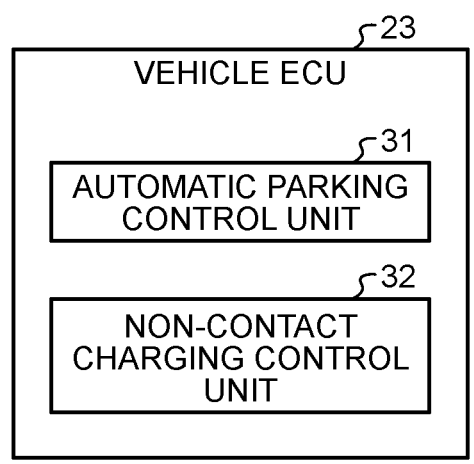
FIG. 2 is a block diagram for explaining a functional configuration of a vehicle ECU.

As illustrated in FIG. 2, the vehicle ECU 23 includes an automatic parking control unit 31, and a non-contact charging control unit 32. The automatic parking control unit 31 executes the automatic parking control for automatically parking the vehicle 3 in the parking space 6. The non-contact charging control unit 32 transmits power from the power transmission coil 11 to the power receiving coil 21 in a non-contact manner, and executes the non-contact charging control for storing the power received by the power receiving coil 21 in the battery 22. The vehicle control includes contactless charging control and automatic parking control.

Figure 3:
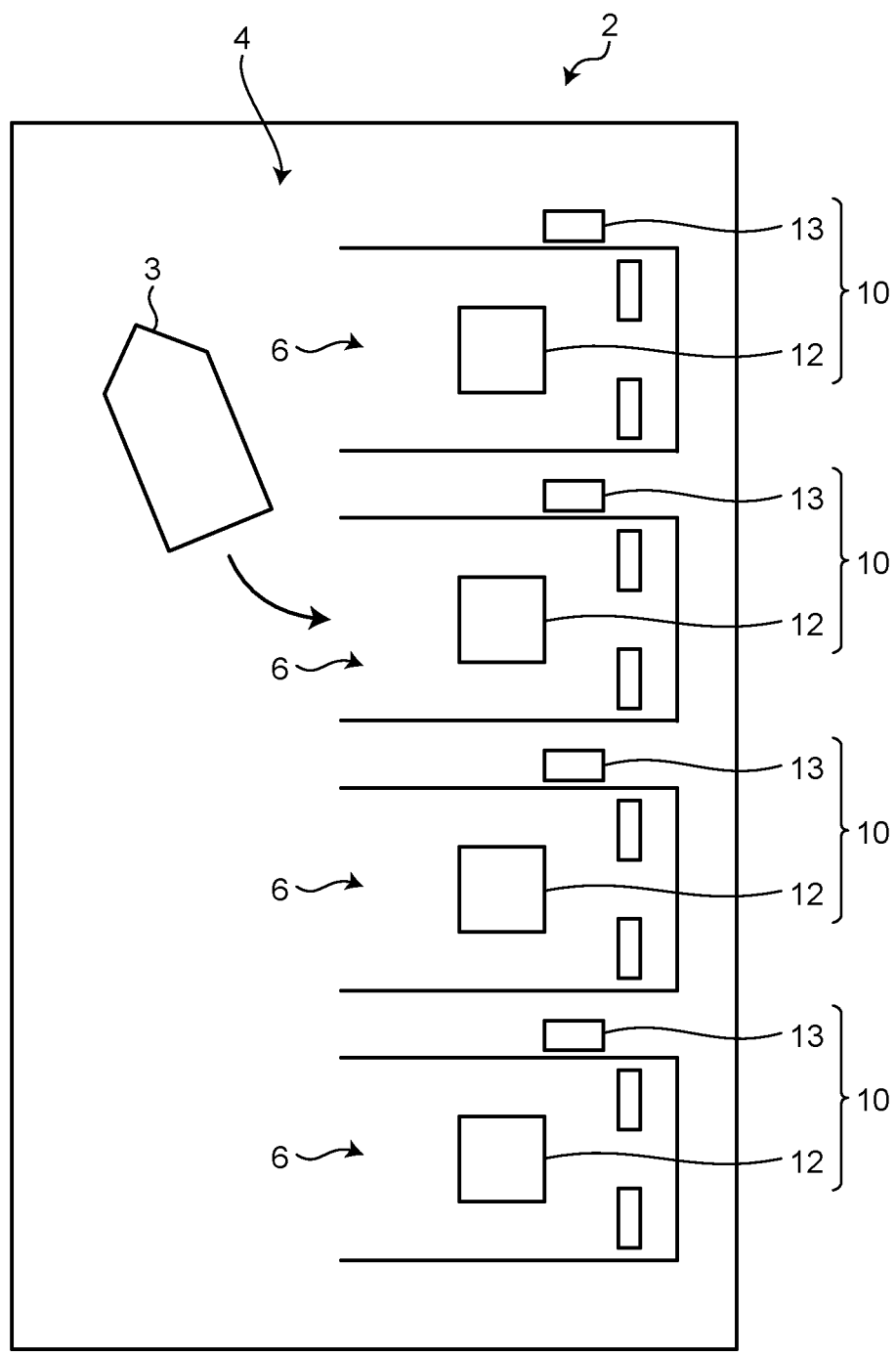
FIG. 3 is a diagram for explaining a parking space and the power transmission device.

As illustrated in FIG. 3, when the vehicle 3 in the parking lot 4 having a plurality of parking spaces 6 performs automatic parking, the user of the vehicle 3 from among the plurality of parking spaces 6 is selected it is possible to automatically park the vehicle 3 in any parking space 6. In this case, the display device 25 can accept a selection operation by the user of the vehicle 3 in a state of displaying an image relating to a plurality of parking spaces 6. That is, the display device 25 functions as an input unit to detect an operation input by the user. The vehicle ECU 23, by detecting the inputting operation to the display device 25, it is possible to determine the parking space 6 of the parking target.

Further, in a state where the vehicle 3 is stopped in the parking space 6, it is possible to perform non-contact charging using the power transmission device 10 and the power receiving device 20. In the non-contact charging system 1, non-contact charging from the power transmission device 10 to the vehicle 3 is performed in a state where wireless communication between the vehicle 3 and the power transmission device 10 is established. That is, the vehicle 3 performs pairing between the vehicle 3 and the power transmission device 10 by wireless communication using the communication device 24, power is transmitted in a non-contact manner from the power transmission coil 11 on the ground side in a state of pairing is completed to the power receiving coil 21 of the vehicle 3 side. In the vehicle 3, the control for supplying the power received by the power receiving coil 21 to the battery 22 is performed.

Since the parking lot 4 is provided with a plurality of power transmission device 10, the vehicle 3, it is necessary to establish a pairing by selecting the communication of the power transmission device 10 installed in the parking space 6 to be parked own vehicle from a plurality of connection destinations. Therefore, when the vehicle 3 performs automatic parking, when the user selects the parking space 6 of the parking target from the input unit such as the display device 25, the vehicle 3 refers to the map information including the radio communication information associated with the parking space 6, the parking target It is configured to be able to automatically connect the wireless communication with the power transmission device 10 installed in the parking space 6.

Then, the vehicle 3 has a map information providing system for use in automatic operation, and has a function of adding additional information to the map information. The vehicle ECU 23 executes the automated driving control of the vehicle 3 using the map information provided by the map information providing system. The Map information providing system can add, for example, information indicating the presence or absence of the power supply facility 2 and wireless communication information of the power transmission device 10 corresponding to the parking space 6 in the parking lot 4 in the power supply facility 2 to the map information, as additional information. That is, the vehicle 3 can acquire the map information including the wireless communication information of the power transmission device 10.

Figure 4:
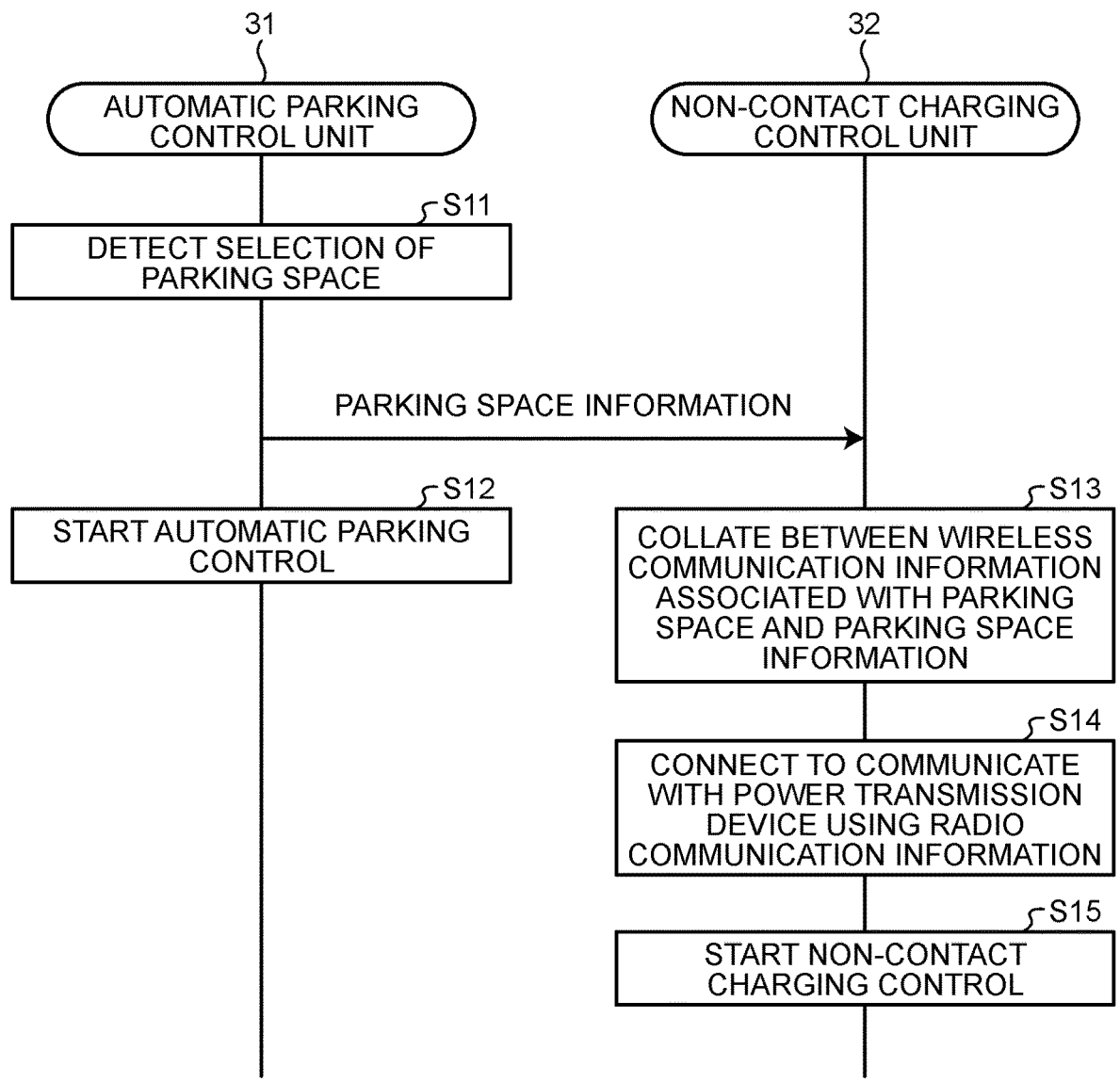
FIG. 4 is a sequence diagram for explaining the control when the vehicle is automatically parked.

FIG. 4 is a sequence diagram for explaining the control when the vehicle is automatically parked. The control illustrated in FIG. 4 is performed by the vehicle ECU 23.

The automatic parking control unit 31 detects that the parking space 6 of the parking target is selected by the user of the vehicle 3 (Step S11). In Step S11, it is detected that the user's selection manipulation for the images displayed on the display device 25 of the vehicle 3 has been performed. That is, it is detected that the user has selected any parking space 6. The automatic parking control unit 31 detects the selection operation, and outputs information about the selected parking space 6 (parking space information) to the non-contact charging control unit 32. Then, the automatic parking control unit 31, when outputting the parking space information, starts automatic parking control (Step S12).

When the parking space information is inputted from the automatic parking control unit 31, The non-contact charging control unit 32 collate between the map information including the wireless communication information associated with the parking space 6 and the parking space information (Step S13). In Step S13, the non-contact charging control unit 32 refers to the map information to identify the radio communication information associated with the power transmission device 10 installed in the parking space 6 to be parked.

Further, when the vehicle 3 receives the radio wave signals from the plurality of power transmission devices 10, the non-contact charging control unit 32 identifies the radio wave signal that matches the radio communication information identified in Step S12, and communicates with the power transmission device 10 that has transmitted the radio wave signal (Step S14). The non-contact charging control unit 32, in a state where the wireless communication information associated with the parking space 6 of the parking target is identified, identifies the radio wave signal of the power transmission device 10 installed in the parking space 6 of the parking target from among a plurality of radio wave signals, and automatically selects the wireless communication with the power transmission device 10. In Step S14, a radio wave signal selection and a communication connection of the power transmission device 10 in the parking space 6 is performed. Then, when the communication connection to the power transmission device 10 is completed, i.e. when the pairing with the power transmission device 10 is completed, the non-contact charging control unit 32 starts the non-contact charging control (Step S15).

Figure 5:
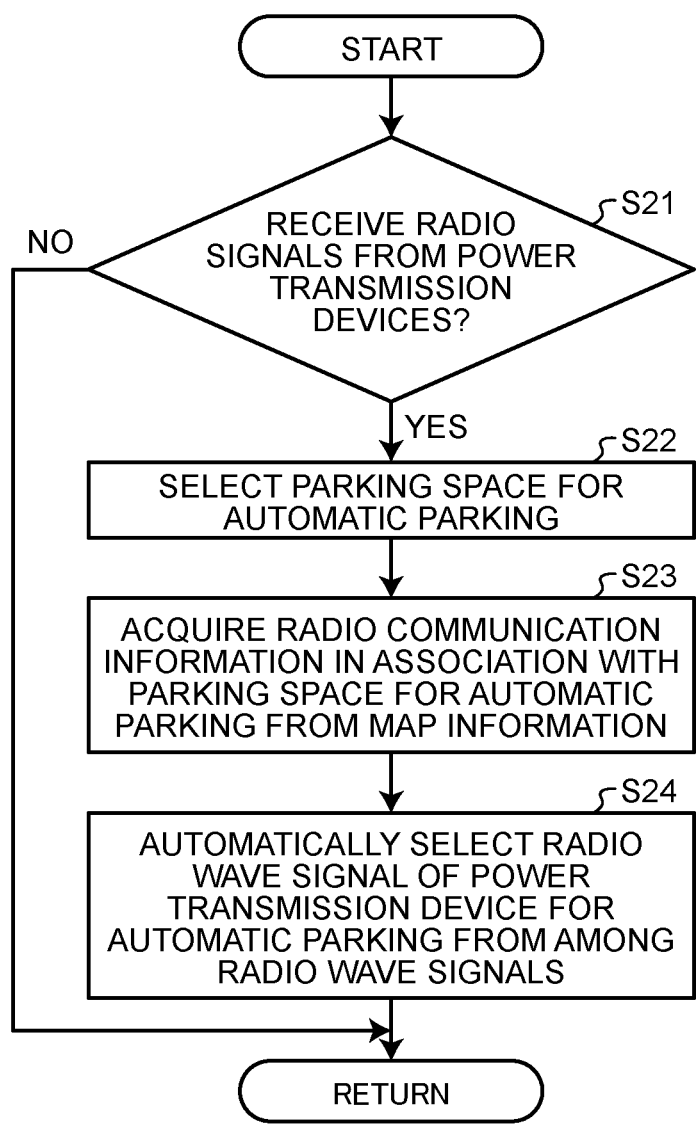
FIG. 5 is a flowchart for explaining the control when the vehicle is automatically parked.

FIG. 5 is a flowchart for explaining the control when the vehicle is automatically parked. The control illustrated in FIG. 5 is implemented by the vehicle ECU 23.

The vehicle ECU 23 determines whether it has received a plurality of radio signals transmitted from the plurality of power transmission devices 10 (Step S21). If it is determined not to receive a plurality of radio waves transmitted from the plurality of power transmission devices 10 (Step S21: No), the control routine ends. If it is determined that it has received a plurality of radio wave signals transmitted from the plurality of power transmission devices 10 (Step S21: Yes), the vehicle ECU 23 selects the parking space 6 to automatically park (Step S22). The vehicle ECU 23 has a function of automatically parking in the parking space 6 selected by the user of the vehicle 3, or has a function of automatically selecting a parking space 6 where to be stopped. The vehicle ECU 23 may have a function of automatically selecting a parking space 6 capable of non-contact charging.

The vehicle ECU 23 acquires the radio communication information associated with the parking space 6 to be automatically parked from the map information (Step S23). In Step S23, in order to identify the radio communication information associated with the parking space 6 selected in Step S22, referring to the map information based on the parking space information, collation between the parking space information and the map information is performed. The vehicle ECU 23 automatically selects the radio wave signals of the power transmission device 10 installed in the parking space 6 of the parking target from among a plurality of radio wave signals (Step S24).

Performing the process of S24 of steps, this control routine ends. As described above, according to the embodiment, it is possible to automatically connect the wireless communication with the power transmission device 10 installed in the parking space 6 of the parking target.

Thus, when automatically parking the vehicle 3 in any parking space 6, it is possible to realize the pairing of the power transmitting device 10 of the parking space 6 side and the power receiving device 20 of the vehicle 3 side in a simple manner.

In the present disclosure, when automatically parking the vehicle in the parking space, it is possible to realize the pairing of the power transmission device and the vehicle-side power receiving device of the parking space side in a simple manner.

According to an embodiment, when automatically parking the vehicle in the parking space, it is possible to realize the pairing of the power transmission device and the vehicle-side power receiving device of the parking space side in a simple manner.

According to an embodiment, when receiving a plurality of radio wave signals transmitted from a plurality of power transmission device during automatic parking control, it is possible to automatically select the radio wave signals of the power transmission device installed in the parking space to be parked.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control device mounted on a vehicle, the vehicle control device having a map information-providing system for use in automatic operation and comprising:
    an automatic parking control unit that performs automatic parking control for automatically parking the vehicle in a parking space which is a parking target selected by a user of the vehicle from among a plurality of parking spaces provided in a parking lot, and
    a non-contact charging control unit that performs non-contact charging control for transmitting power from a power transmission device installed in the parking space to a power receiving device provided in the vehicle in a non-contact manner and stores the power in a battery mounted on the vehicle, wherein
    while the automatic parking control unit performs the automatic parking control, the non-contact charging control unit specifies radio communication information associated with the parking space of the parking target with reference to map information, and performs pairing between the power transmission device and the power receiving device by using the specified radio communication information, and
    the map information is provided by the map information-providing system and is used in an automated driving control of the vehicle, and
    the map information-providing system adds additional information to the map information, the additional information including at least the radio communication information of the power transmission device corresponding to the parking space.

2. A vehicle control device according to claim 1, wherein while the automatic parking control unit performs the automatic parking control, when the vehicle receives a plurality of radio wave signals transmitted from a plurality of power transmission devices, the non-contact charging control unit automatically selects a radio wave signal transmitted from the power transmission device installed in the parking space of the parking target on a basis of the specified radio communication information.

* * * * *